US012786705B2

(12) United States Patent
Lowe et al.

(10) Patent No.: US 12,786,705 B2
(45) Date of Patent: Nov. 3, 2026

(54) SECURITY SYSTEM FOR ELECTRONIC DEVICES CONNECTED TO A VEHICLE

(71) Applicant: GM GLOBAL TECHNOLOGY OPERATIONS LLC, Detroit, MI (US)

(72) Inventors: Infane Lowe, Grand Blanc, MI (US); Lyall Kenneth Winger, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 958 days.

(21) Appl. No.: 18/084,180

(22) Filed: Dec. 19, 2022

(65) Prior Publication Data

US 2024/0205671 A1 Jun. 20, 2024

(51) Int. Cl.
*H04W 12/06* (2021.01)
*H04W 12/106* (2021.01)

(52) U.S. Cl.
CPC ......... *H04W 12/06* (2013.01); *H04W 12/106* (2021.01)

(58) Field of Classification Search
CPC ....... H04W 12/06; H04W 12/08; H04W 4/40; H04W 4/80
See application file for complete search history.

(56) References Cited

U.S. PATENT DOCUMENTS

| | | | | |
|---|---|---|---|---|
| 2006/0172577 A1* | 8/2006 | Howard | H01R 43/18 439/282 |
| 2006/0232131 A1* | 10/2006 | Endo | B60R 25/043 307/10.2 |
| 2008/0105960 A1* | 5/2008 | See | H10W 74/019 257/676 |
| 2013/0091907 A1* | 4/2013 | Nishijima | B60L 53/14 70/237 |
| 2015/0216525 A1* | 8/2015 | Collins | A61B 90/90 227/176.1 |
| 2017/0357797 A1* | 12/2017 | Rubinstein | G06F 21/602 |

* cited by examiner

*Primary Examiner* — Sam Bhattacharya

(57) ABSTRACT

A security system for an electronic device connected to a vehicle includes an electronic device. A first mating connector is one of integrated with the electronic device, and connected by conductors and the first mating connector to the electronic device. The first mating connector includes a security integrated circuit configured to perform authentication and a second mating connector. A host controller is connected by the second mating connector to the electronic device and the first mating connector to the security integrated circuit and the electronic device. The host controller is configured to communicate with the security integrated circuit to authenticate the electronic device.

20 Claims, 3 Drawing Sheets

SECURITY SYSTEM FOR ELECTRONIC DEVICES CONNECTED TO A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a security system for electronic devices, and more particularly to a security system for electronic devices connected to a vehicle.

Aftermarket parts suppliers produce replacement parts for vehicles. In some situations, the aftermarket parts meet the design standards that are set by the original equipment manufacturers (OEMs). In other situations, the aftermarket parts do not meet the standards set by the OEMs.

Some standards such as International Organization for Standardization (ISO) 26262 define functional safety as the absence of unreasonable risk due to hazards caused by malfunctioning behavior of electrical or electronic systems. ISO 26262 defines different automotive safety integrity levels or ASILs to establish suitable safety requirements based on the probability and acceptability of harm for automotive components. There are four ASIL levels identified by ISO 26262 including A, B, C, and D. ASIL-A represents the lowest degree of automotive hazard and ASIL-D represents the highest degree of automotive hazard.

Systems like airbags, anti-lock brakes, drive by wire, and power steering require an ASIL-D grade because the risks associated with their failure are the highest. On the other end of the safety spectrum, components like rear lights require only an ASIL-A grade. Headlights and brake lights generally would be ASIL-B while cruise control would generally be ASIL-C.

SUMMARY

A security system for an electronic device connected to a vehicle includes an electronic device. A first mating connector is one of integrated with the electronic device, and connected by conductors and the first mating connector to the electronic device. The first mating connector includes a security integrated circuit configured to perform authentication and a second mating connector. A host controller is connected by the second mating connector to the electronic device and the first mating connector to the security integrated circuit and the electronic device. The host controller is configured to communicate with the security integrated circuit to authenticate the electronic device.

In other features, the host controller authenticates the security integrated circuit over a single bidirectional conductor. The first mating connector includes a female connector, and the second mating connector includes a male connector. The security integrated circuit includes a substrate. The security integrated circuit is mounted to the substrate. Bond wires connect the security integrated circuit to one or more conductors of the first mating connector. Encapsulation material encapsulates the first mating connector, the substrate, the security integrated circuit, and the bond wires.

In other features, the security integrated circuit is attached to the first mating connector. The first mating connector and the security integrated circuit are over molded. The security integrated circuit is attached to the first mating connector. The security integrated circuit is connected by one or more bond wires to conductors of the first mating connector. The security integrated circuit and the one or more bond wires are covered with a glob-top material.

In other features, the security integrated circuit is configured to authenticate a plurality of the electronic device. The security integrated circuit is configured to respond to an authentication message when the authentication message includes a device ID matching a device ID of the security integrated circuit.

A vehicle comprises the security system and a telematics system. After the electronic device has a predetermined number of failed authentication attempts, the host controller is configured to send an authentication failure message via the telematics system of the vehicle.

A vehicle includes the security system and at least one of a vehicle control module and a powertrain control module. After the electronic device has a predetermined number of failed authentication attempts, the host controller is configured to send a message to the at least one of the vehicle control module and the powertrain control module to alter operation of the vehicle.

A vehicle includes the security system and at least one of a vehicle control module and a powertrain control module. After the electronic device has a predetermined number of failed authentication attempts, the host controller is configured to send a message to the at least one of the vehicle control module and the powertrain control module to reduce performance of the vehicle.

A vehicle includes a security system comprising an electronic device and a first mating connector one of integrated with the electronic device, and connected by conductors and the first mating connector to the electronic device. The first mating connector includes a security integrated circuit configured to perform authentication and a second mating connector. A host controller is connected by the second mating connector to the electronic device and the first mating connector to the security integrated circuit and the electronic device. The host controller is configured to communicate with the security integrated circuit to authenticate the electronic device. The vehicle includes at least one of a vehicle control module and a powertrain control module. After the electronic device has a predetermined number of failed authentication attempts, the host controller is configured to send a message to the at least one of the vehicle control module and the powertrain control module to alter operation of the vehicle.

In other features, the host controller authenticates the security integrated circuit over a single bidirectional conductor. The first mating connector includes a female connector, and the second mating connector includes a male connector.

In other features, the security integrated circuit includes a substrate. The security integrated circuit is mounted to the substrate. Bond wires connect the security integrated circuit to one or more conductors of the first mating connector. Encapsulation material encapsulates the first mating connector, the substrate, the security integrated circuit, and the bond wires.

In other features, the security integrated circuit is attached to the first mating connector, and the first mating connector and the security integrated circuit are over molded.

In other features, the security integrated circuit is attached to the first mating connector. The security integrated circuit is connected by one or more bond wires to conductors of the first mating connector. The security integrated circuit and the one or more bond wires are covered with a glob-top material.

In other features, the vehicle includes a telematics system. After the electronic device has the predetermined number of failed authentication attempts, the host controller is configured to send an authentication failure message via the telematics system of the vehicle.

In other features, the vehicle includes at least one of a vehicle control module and a powertrain control module. After the electronic device has the predetermined number of failed authentication attempts, the host controller is configured to send a message to the at least one of the vehicle control module and the powertrain control module to reduce performance of the vehicle.

In other features, the security integrated circuit is configured to authenticate a plurality of the electronic device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the present disclosure is described in the context of a security system for electronic devices of a vehicle, the security system can be used for electronic devices in non-vehicle applications.

Figure 1:
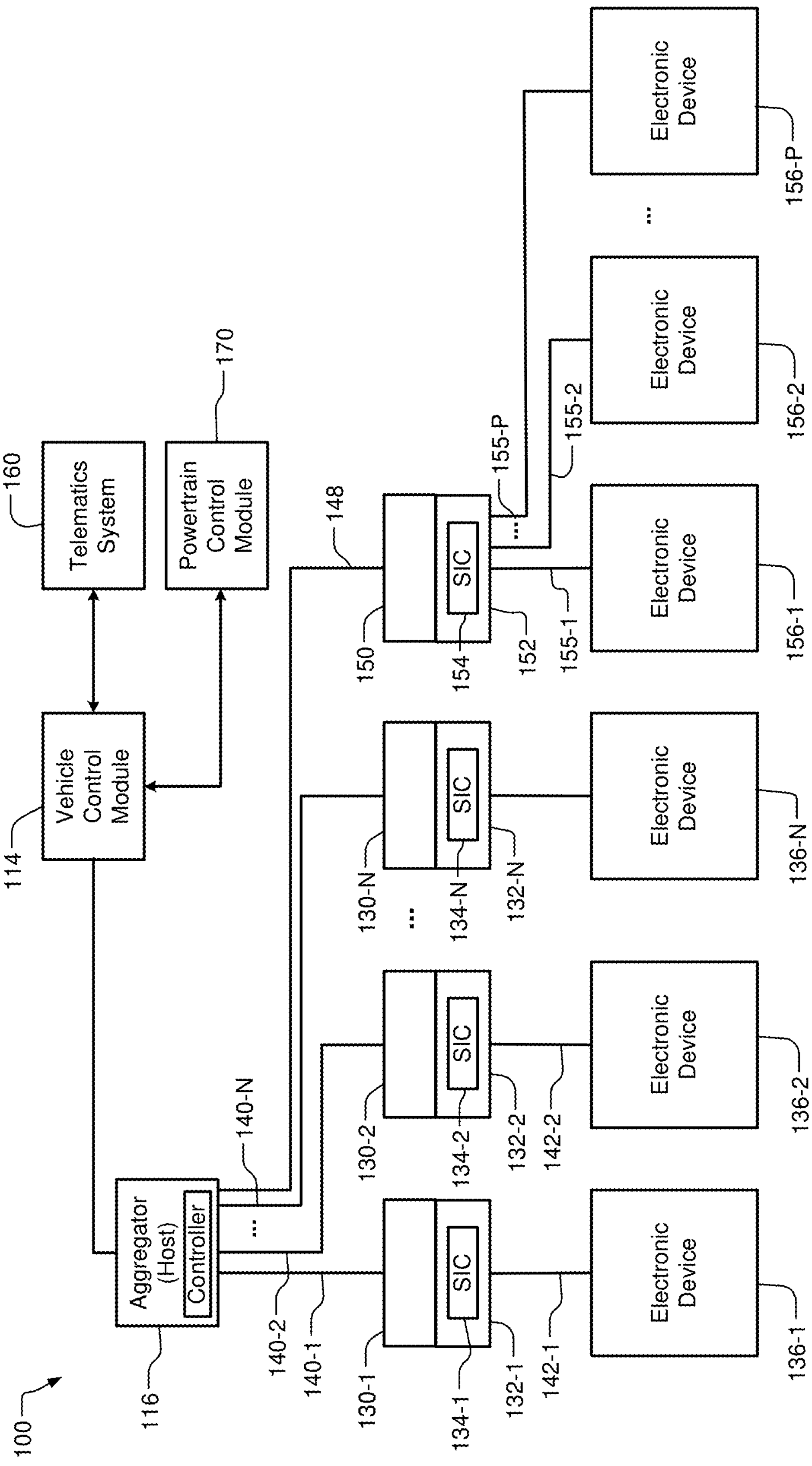
FIG. 1 is a functional block diagram of an example of a vehicle including a vehicle control module, a host, and a plurality of electronic devices including connectors with security integrated circuits according to the present disclosure.

Referring now to FIG. 1, a vehicle 100 includes a vehicle control module 114, a host controller 116, and a plurality of electronic devices 136-1, 136-2, . . . , and 136-N (individually or collectively referred to as electronic devices 136). The electronic devices 136 include mating connectors 132-1, 132-2, . . . , and 132-N (individually or collectively referred to as mating connectors 132) with security integrated circuits 134-1, 134-2, . . . , and 134-N (individually or collectively referred to as security integrated circuits 134). In some examples, the electronic devices 136 form part of a higher risk system such as ASIL-C or ASIL-D systems. In some examples, the electronic devices 136 form part of airbags, anti-lock brakes, drive by wire, power steering systems and/or other vehicle systems.

The host controller 116 is connected by conductors 140-1, 140-2, . . . , and 140-N (individually or collectively referred to as conductors 140) and mating connectors 130-1, 130-2, . . . , and 130-N (individually or collectively referred to as mating connectors 130) to the mating connectors 132. The mating connectors 132 are integrated with the electronic devices 136 or connected by conductors 142-1, 142-2, . . . , and 142-N (individually or collectively referred to as conductors 142) to the corresponding ones of the electronic devices 136. In some examples, some or all of the conductors 142 can be omitted if the mating connectors 132 are integrated with the corresponding one of the electronic devices 136. In some examples, the security integrated circuits 134 are integrated with packaging of the mating connectors 132 as will be described further below. In some examples, the security integrated circuits 134 are configured to support bidirectional communication relating to security with the host controller 116 over a single conductor (corresponding to one conductor of each of the conductors 140).

The vehicle 100 further includes a powertrain control module 170 and a telematics system 160. The vehicle control module 114 controls various operational functions of the vehicle 100. In some examples, the vehicle control module 114 is implemented by a plurality of interconnected microcontrollers acting as a pooled resource. In some examples, the vehicle control module 114 communicates with the host controller 116 using an Ethernet switch and Ethernet lines and connectors. In other examples, a communication area network (CAN) bus can be used. The powertrain control module 170 communicates with the vehicle control module 114 to control powertrain components (e.g., an internal combustion engine, an electric machine, and/or battery system). In some examples, the powertrain control module 170 is also implemented by a plurality of microcontrollers acting as a pooled resource.

In some examples, conductors 148 and a mating connector 150 connect the host controller 116 to a mating connector 152 including a security integrated circuit 154. The security integrated circuit 154 handles security for more than one electronic device. For example, P electronic devices 156-1, 156-2, . . . , and 156-P are connected by conductors 155-1, 155-2, . . . , and 155-P, respectively, where P is an integer greater than one.

Figure 2:
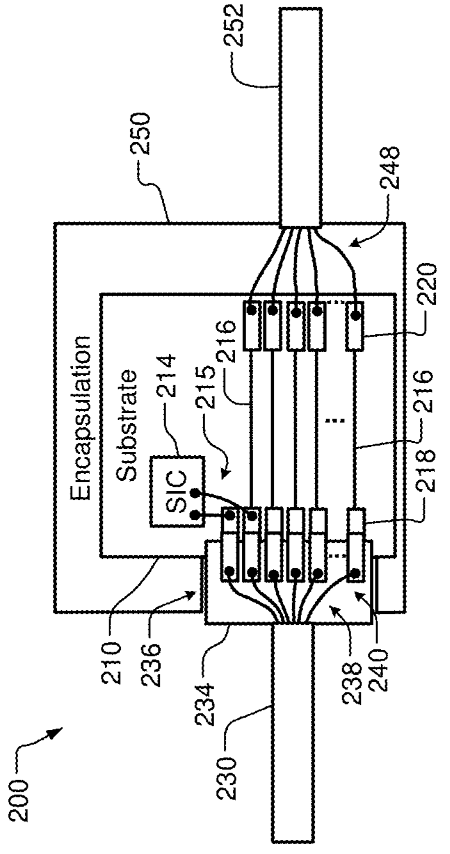
FIGS. 2 to 4 are examples of connectors with security integrated circuits according to the present disclosure.
Figure 3:
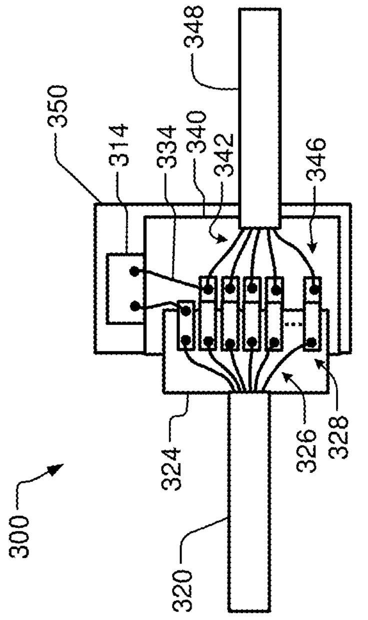
Figure 4:
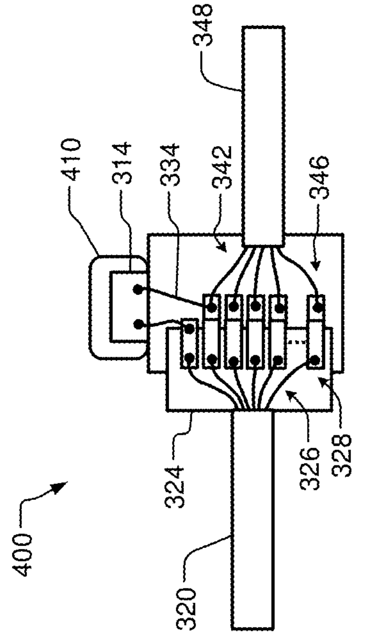

Referring now to FIGS. 2 to 4, examples of connectors with integrated security integrated circuits are shown. In FIG. 2, a connection system 200 includes a security integrated circuit (SIC) 214 that is mounted on a substrate 210. The substrate 210 includes pads 218, 220 and conductive traces 216 connecting the pads 218 and 220 on opposite sides of the substrate 210. The SIC 214 is connected by bond wires or other connections at 215 to some of the pads 218. For example, bond wires 215 connect the bidirectional signal line and a parasitic capacitor to the SIC 214. The parasitic capacitor powers the SIC 214 when it is not communicating.

Conductors 230 from the host controller 116 are connected at a mating connector 234 by wires 238 and terminals 240. The terminals 240 are aligned with and contact the pads 218 when the mating connector 234 is inserted into a mating connector 236. The pads 220 are connected by wires 248 to conductors 252 connected to the corresponding electronic device. In some examples some or all of the substrate 210, the security integrated circuit 214, and the mating connector 234 are encapsulated in a molding material at 250. In other words, the single bidirectional communication line is connected to the security integrated circuit 214 along with power and ground. In some examples, power and ground and one or more other conductors are directly connected from the host controller to the electronic device.

In FIG. 3, a connection system 300 includes a security integrated circuit (SIC) 314. Conductors 320 from the host controller 116 are connected at a mating connector 324 by wires 326 and terminals 328. The terminals 328 are aligned with terminals 346 of a mating connector 340. Conductors 348 of the corresponding electronic devices are connected to the terminals 346 at 342. Bond wires 334 connect the SIC 314 to the bidirectional signal line and a parasitic capacitor. The SIC 314 and the mating connector 340 are over molded at 350.

In FIG. 4, a connection system 400 is shown and is similar to the connection system 300 except that a glob-top 410 encapsulates the SIC 314 onto the mating connector 340.

Figure 5:
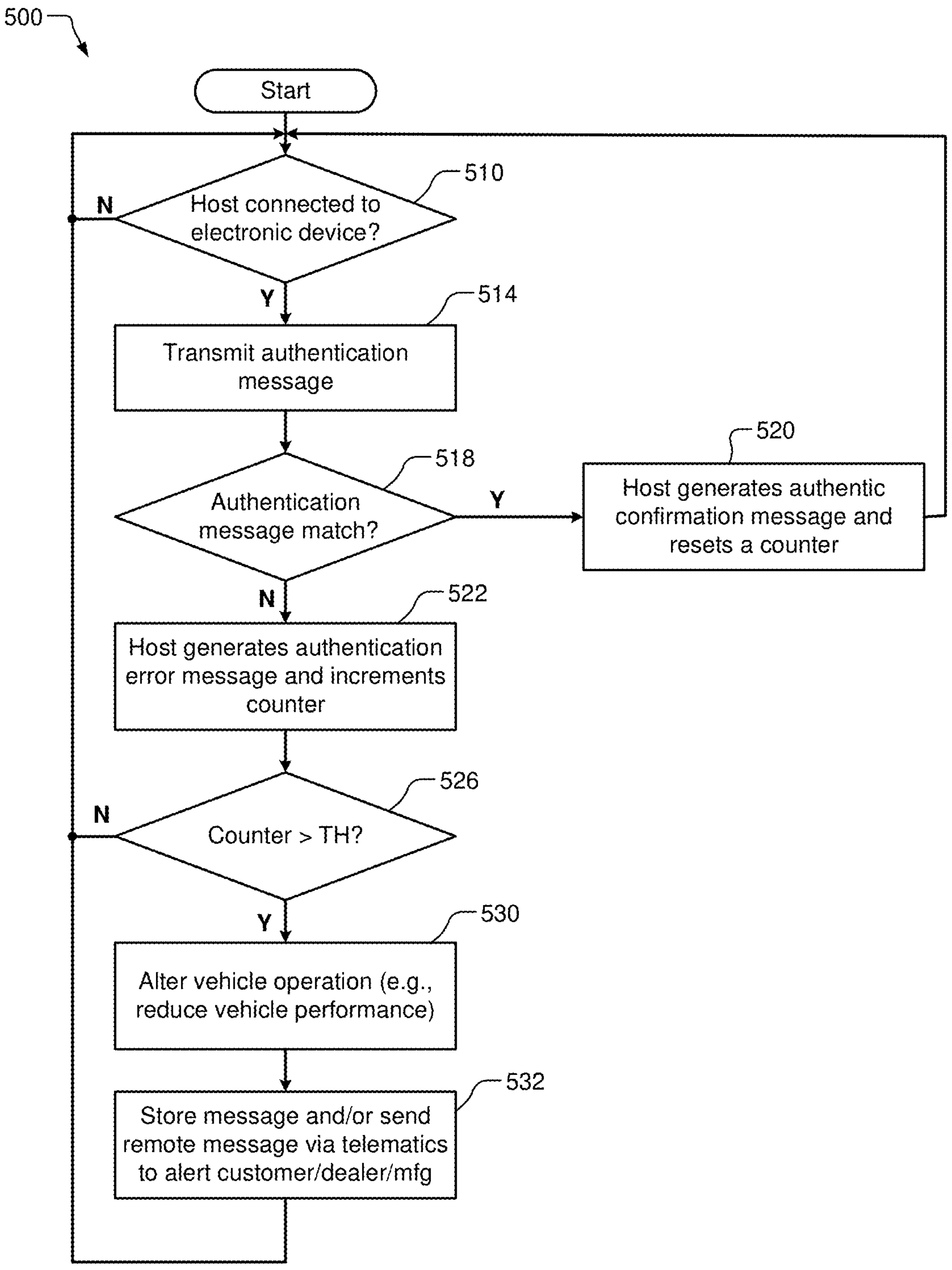
FIG. 5 is a flowchart of an example of a method for operating a security system for electronic devices connected to the vehicle according to the present disclosure.

Referring now to FIG. 5, a method 500 is shown for operating a security system for electronic devices of the vehicle according to the present disclosure. At 510, the host controller determines whether a connector is connected thereto. If 510 is true, the host controller sends an authentication message at 514. At 518, the host controller determines whether the authentication message from the electronic device is a match. If 518 is true, the host controller generates a confirmation message at 520 that can be stored locally in the vehicle or transmitted remotely via the telematics system. If a match occurs, the host controller resets a counter.

If 518 is false, the host controller generates an error message and increments the counter. At 526, the method determines whether the counter is greater than a counter threshold TH. In some examples, the counter threshold is equal to 2, 3 or another integer. The counter performs a predetermined number of retries after authentication failure before taking corrective action such as reducing power, sending error messages, and/or disabling functionality.

If 526 is false, the method returns to 510. If 526 is true, the method continues at 530 and alters vehicle operation (e.g., reduces vehicle performance). At 532, a message stored and/or sent remotely via the telematics system to alert the customer, the dealer, and/or the manufacturer.

In some examples, an authentication message includes a device ID. The SIC responds to the authentication messages only when the device ID matches the device ID in the authentication message.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A security system for an electronic device connected to a vehicle, comprising:
- an electronic device;
- a first mating connector:
  - integrated with the electronic device, and
  - connected by conductors and the first mating connector to the electronic device,
- wherein the first mating connector includes a security integrated circuit configured to perform authentication for the electronic device;
- a second mating connector; and
- a host controller connected by the second mating connector to the electronic device and the security integrated circuit,
- wherein the host controller is configured to communicate an authentication message with a device identification (ID) to the security integrated circuit to authenticate the electronic device,
- wherein the security integrated circuit is configured to provide a response to the authentication message in response to the device ID in the authentication message matching with a device ID previously stored on the security integrated circuit,
- wherein the host controller is configured to generate a confirmation message in response to receiving the response from the security integrated circuit and to generate an error message in response to not receiving the response from the security integrated circuit.

2. The security system of claim 1, wherein the first mating connector is integrated with the electronic device and the electronic device is an aftermarket part, wherein the host controller permits the vehicle to perform an operation associated with the aftermarket part in response to the confirmation message and to alter the operation in response to the error message.

3. The security system of claim 1, wherein the first mating connector includes a female connector, and the second mating connector includes a male connector.

4. The security system of claim 1, wherein the security integrated circuit includes:
- a substrate, wherein the security integrated circuit is mounted to the substrate;
- bond wires connecting the security integrated circuit to one or more conductors of the first mating connector; and
- encapsulation material encapsulating the first mating connector, the substrate, the security integrated circuit, and the bond wires.

5. The security system of claim 1, wherein:
- the security integrated circuit is attached to the first mating connector, and
- the first mating connector and the security integrated circuit are over molded.

6. The security system of claim 1, wherein:
- the security integrated circuit is attached to the first mating connector,
- the security integrated circuit is connected by one or more bond wires to conductors of the first mating connector, and
- the security integrated circuit and the one or more bond wires are covered with a glob-top material.

7. The security system of claim 1, wherein the security integrated circuit is configured to authenticate a plurality of the electronic devices to the host controller.

8. A vehicle comprising:
- the security system of claim 1; and
- a telematics system,
- wherein, after the electronic device has a predetermined number of failed authentication attempts, the host controller is configured to send an authentication failure message via the telematics system of the vehicle, wherein the host controller includes a counter configured to track the error message and is configured to determine the predetermined number of failed authentication attempts in response to the counter exceeding a predetermined threshold.

9. A vehicle comprising:
- the security system of claim 1; and
- at least one of a vehicle control module and a powertrain control module,
- wherein, after the electronic device has a predetermined number of failed authentication attempts, the host controller is configured to send a message to the at least one of the vehicle control module and the powertrain control module to alter the operation of the vehicle, wherein the host controller includes a counter configured to track the error message and is configured to determine the predetermined number of failed attempts in response to the counter exceeding a predetermined threshold.

10. A security system for an electronic device connected to a vehicle, comprising:

an electronic device;

a first mating connector:

integrated with the electronic device, and connected by conductors and the first mating connector to the electronic device, wherein the first mating connector includes a security integrated circuit configured to perform authentication;

a second mating connector; and a host controller connected by the second mating connector to the electronic device and the first mating connector to the security integrated circuit and the electronic device, wherein the host controller is configured to communicate with the security integrated circuit to authenticate the electronic device, wherein the security integrated circuit is configured to respond to an authentication message when the authentication message includes a device ID matching a device ID of the security integrated circuit.

11. A vehicle comprising:

the security system of claim 8; and at least one of a vehicle control module and a powertrain control module, wherein, after the electronic device has a predetermined number of failed authentication attempts, the host controller is configured to send a message to the at least one of the vehicle control module and the powertrain control module to reduce performance of the vehicle.

12. A vehicle, comprising:

a security system comprising:

an electronic device;

a first mating connector one of:

integrated with the electronic device, and connected by conductors and the first mating connector to the electronic device, wherein the first mating connector includes a security integrated circuit configured to perform authentication;

a second mating connector; and a host controller connected by the second mating connector to the electronic device and the first mating connector to the security integrated circuit and the electronic device, wherein the host controller is configured to communicate an authentication message to the security integrated circuit to authenticate the electronic device; and at least one of a vehicle control module and a powertrain control module, wherein, after the electronic device has a predetermined number of failed authentication attempts, the host controller is configured to send a message to the at least one of the vehicle control module and the powertrain control module to alter operation of the vehicle, wherein the host controller is configured to determine a failed attempt of the predetermined number of failed authentication attempts in response to the security integrated circuit failing to respond to the authentication message.

13. The vehicle of claim 12, wherein the security integrated circuit is configured to provide a response to the authentication message in response to a device identification (ID) in the authentication message matching with a device ID previously stored on the security integrated circuit.

14. The vehicle of claim 13, further comprising:

a telematics system, wherein, after the electronic device has the predetermined number of failed authentication attempts, the host controller is configured to send an authentication failure message via the telematics system of the vehicle.

15. The vehicle of claim 13, further comprising:

wherein, after the electronic device has the predetermined number of failed authentication attempts, the host controller is configured to send a message to the at least one of the vehicle control module and the powertrain control module to reduce performance of the vehicle.

16. The vehicle of claim 12, wherein the first mating connector includes a female connector, and the second mating connector includes a male connector.

17. The vehicle of claim 12, wherein the security integrated circuit includes:

a substrate, wherein the security integrated circuit is mounted to the substrate;

bond wires connecting the security integrated circuit to one or more conductors of the first mating connector; and encapsulation material encapsulating the first mating connector, the substrate, the security integrated circuit, and the bond wires.

18. The vehicle of claim 12, wherein:

the security integrated circuit is attached to the first mating connector, and the first mating connector and the security integrated circuit are over molded.

19. The vehicle of claim 12, wherein:

the security integrated circuit is attached to the first mating connector, the security integrated circuit is connected by one or more bond wires to conductors of the first mating connector, and the security integrated circuit and the one or more bond wires are covered with a glob-top material.

20. The vehicle of claim 12, wherein the security integrated circuit is configured to authenticate a plurality of the electronic devices.

* * * * *